US009609469B2

(12) United States Patent
Khorashadi et al.

(10) Patent No.: US 9,609,469 B2
(45) Date of Patent: Mar. 28, 2017

(54) SEEDING AN ESTIMATOR WHEN RECEIVING ASSISTANCE DATA ON A SLOW LINK

(71) Applicant: QUALCOMM Incorporated, San Diego, CA (US)

(72) Inventors: Behrooz Khorashadi, Mountain View, CA (US); Faraz Mohammad Mirzaei, San Jose, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 14/098,976

(22) Filed: Dec. 6, 2013

(65) Prior Publication Data

US 2015/0080024 A1    Mar. 19, 2015

Related U.S. Application Data

(60) Provisional application No. 61/880,082, filed on Sep. 19, 2013.

(51) Int. Cl.
*H04W 4/02* (2009.01)
*G01S 5/02* (2010.01)
*G01S 19/05* (2010.01)

(52) U.S. Cl.
CPC .......... *H04W 4/02* (2013.01); *G01S 5/0236* (2013.01); *G01S 5/0263* (2013.01); *G01S 5/0294* (2013.01); *G01S 19/05* (2013.01)

(58) Field of Classification Search
CPC ..................................................... H04W 4/02
See application file for complete search history.

(56) References Cited

U.S. PATENT DOCUMENTS

| 7,822,423 | B2 | 10/2010 | Maanoja et al. | |
|---|---|---|---|---|
| RE42,285 | E | 4/2011 | Anderson et al. | |
| 8,295,853 | B2 | 10/2012 | Heikkilä et al. | |
| 2005/0280576 | A1* | 12/2005 | Shemesh et al. | 342/357.1 |
| 2010/0120449 | A1* | 5/2010 | Jakorinne et al. | 455/456.1 |

(Continued)

FOREIGN PATENT DOCUMENTS

DE    102011103875 A1    12/2012

OTHER PUBLICATIONS

International Search Report and Written Opinion—PCT/US2014/051549—ISA/EPO—Jan. 13, 2015.

*Primary Examiner* — Vladimir Magloire
*Assistant Examiner* — David Orange
(74) *Attorney, Agent, or Firm* — Silicon Valley Patent Group LLP

(57) ABSTRACT

Systems, apparatus and methods for determining a location of a mobile device are presented. Often a mobile device requests assistance data from a location server. If the mobile device expects a significant delayed response in receiving the assistance data, the mobile device may determine a seed location or rough location estimate from a server. The mobile device may also request a map to display and/or a data structure for its estimator. The mobile device may preload the estimator with the rough location estimate and/or the data structure. After preloading, the estimator determines a location of the mobile device. Also, the mobile device may show the map to a user via a display.

30 Claims, 10 Drawing Sheets

(56) References Cited

U.S. PATENT DOCUMENTS

| | | |
|---|---|---|
| 2012/0028649 A1* | 2/2012 | Gupta et al. ............... 455/456.1 |
| 2012/0039365 A1 | 2/2012 | Suzuki et al. |
| 2012/0239291 A1 | 9/2012 | Do |
| 2013/0064219 A1 | 3/2013 | Siomina et al. |
| 2013/0322702 A1* | 12/2013 | Piemonte et al. ............ 382/113 |
| 2014/0141803 A1* | 5/2014 | Marti et al. ................ 455/456.2 |

* cited by examiner

Requests sent to common server

Requests sent to separate servers

SEEDING AN ESTIMATOR WHEN RECEIVING ASSISTANCE DATA ON A SLOW LINK

CROSS-REFERENCE TO RELATED APPLICATIONS

This application claims the benefit of and priority under 35 U.S.C. §119(e) to U.S. Provisional Application No. 61/880,082, filed Sep. 19, 2013, and entitled "Dynamic position partitioning for better user experience in indoor positioning," which is incorporated herein by reference in its entirety.

BACKGROUND

I. Field of the Invention

This disclosure relates generally to systems, apparatus and methods for determining a position of a wireless device, and more particularly to using a rough location estimate to bootstrap an estimator, such as a particle filter.

II. Background

Often a mobile device requests and waits for assistance data before determining a position with an estimator. During this time the mobile device is idle. What is needed is using this idle time to better prepare or preload the estimator before applying the assistance data.

BRIEF SUMMARY

Disclosed are systems, apparatus and methods for using a rough location estimate received from a server to bootstrap an estimator.

According to some aspects, disclosed is a method in a mobile device to estimate a location, the method comprising: sending an assistance data request to a location server; determining a transmission rate between the mobile device and the location server is less than a threshold; sending a rough location estimate request based on the transmission rate being less than the threshold; receiving a rough location estimate in response to sending the rough location estimate request; bootstrapping an estimator in the mobile device with the rough location estimate; receiving assistance data in response to the assistance data request; loading the estimator with the assistance data; and determining a location estimate of the mobile device from the estimator.

According to some aspects, disclosed is a mobile device for estimating a location, the mobile device comprising: means for sending an assistance data request to a location server; means for determining a transmission rate between the mobile device and the location server is less than a threshold; means for sending a rough location estimate request based on the transmission rate being less than the threshold; means for receiving a rough location estimate in response to sending the rough location estimate request; means for bootstrapping an estimator in the mobile device with the rough location estimate; means for receiving assistance data in response to the assistance data request; means for loading the estimator with the assistance data; and means for determining a location estimate of the mobile device from the estimator.

According to some aspects, disclosed is a mobile device for estimating a location, the mobile device comprising: a transmitter configured to send an assistance data request to a location server and to send a rough location estimate request based on a transmission rate being less than a threshold; a receiver configured to receive a rough location estimate sent in response to sending the rough location estimate request, and to receive assistance data sent in response to the assistance data request; an estimator configured to bootstrap with the rough location estimate; and a processor configured to determine the transmission rate between the mobile device and the location server is less than the threshold, and to determine a location estimate of the mobile device from the estimator.

According to some aspects, disclosed is a non-transient computer-readable storage medium including program code stored thereon, comprising program code to: send an assistance data request to a location server; determine a transmission rate between a mobile device and the location server is less than a threshold; send a rough location estimate request based on the transmission rate being less than the threshold; receive a rough location estimate in response to sending the rough location estimate request; bootstrap an estimator with the rough location estimate; receive assistance data in response to the assistance data request; load the estimator with the assistance data; and determine a location estimate of the mobile device from the estimator.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
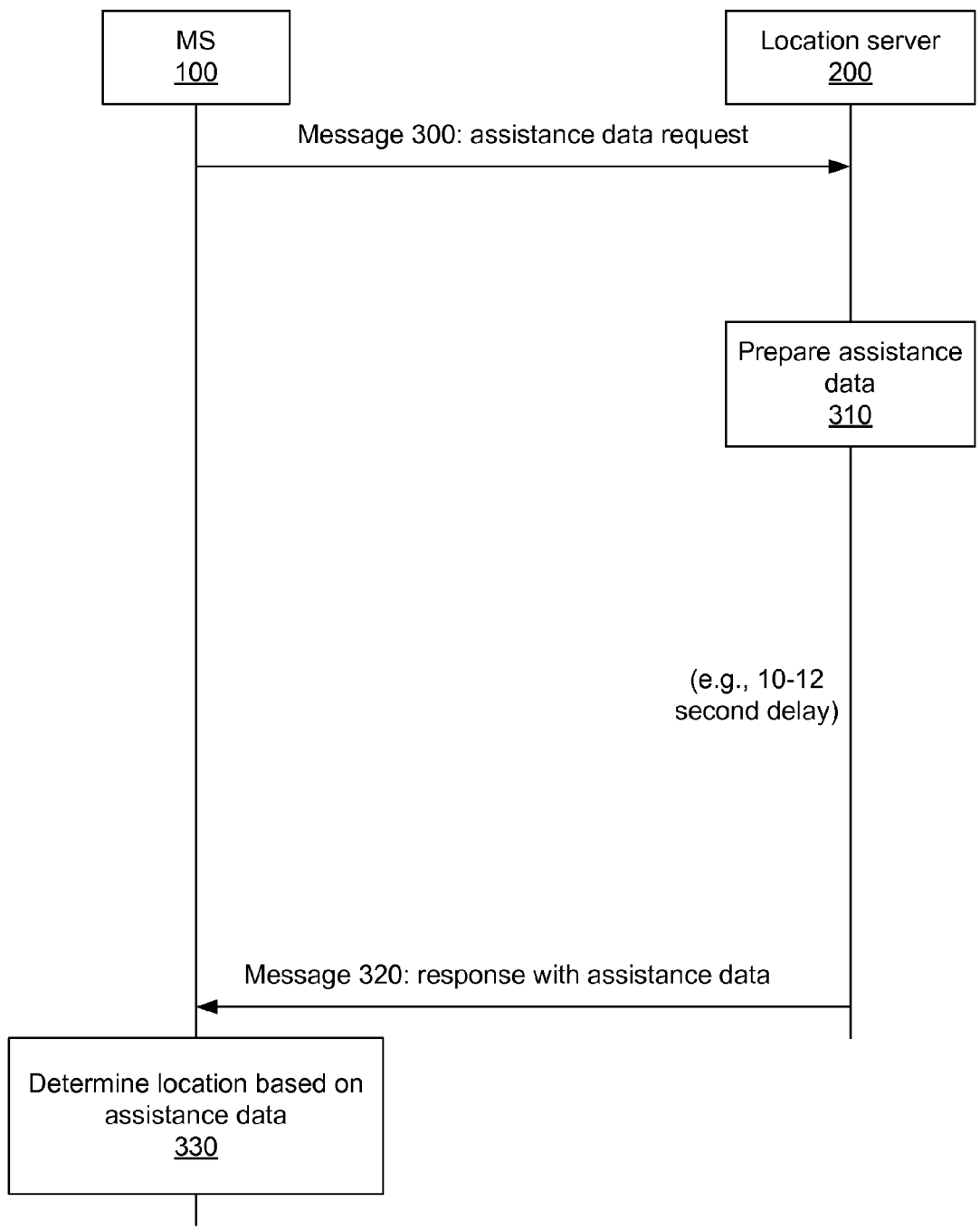
FIG. 1 shows a message on a slow link.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

FIG. 1 shows message 300 data on a slow link. A mobile device 100 (shown as MS 100) sends a message 300 to a location server 200. The message 300 contains an assistance data request. Typically, a mobile device 100 sends an assistance data request message when the mobile device 100 is about to estimate its own location and does not have fresh and valid assistance data. That is, the assistance data may be stale or non-existent in the mobile device 100.

The location server 200 receives message 300 requesting assistance data. At 310, the location server 200 prepares assistance data tailored for an approximate location of the mobile device 100 in response to message 300. The approximate location may be at a center of a coverage area for the mobile device 100. In this case, the link throughput, link rate or transmission rate between the mobile device 100 and the location server 200 is below a threshold. For example, the assistance data may take several seconds (e.g., 10-12 seconds) or longer to complete transmission from the location server 200 to the mobile device 100. The transmission of the assistance data may take several seconds because the actual transmission rate is low (i.e., low number of bits per second) or the effective transmission rate is low because of latency from heavy traffic.

After several seconds, the mobile device 100 finally receives message 320 including a response containing the assistance data. At 330, the mobile device 100 determines its own location based on the assistance data received in message 320.

Figure 2:
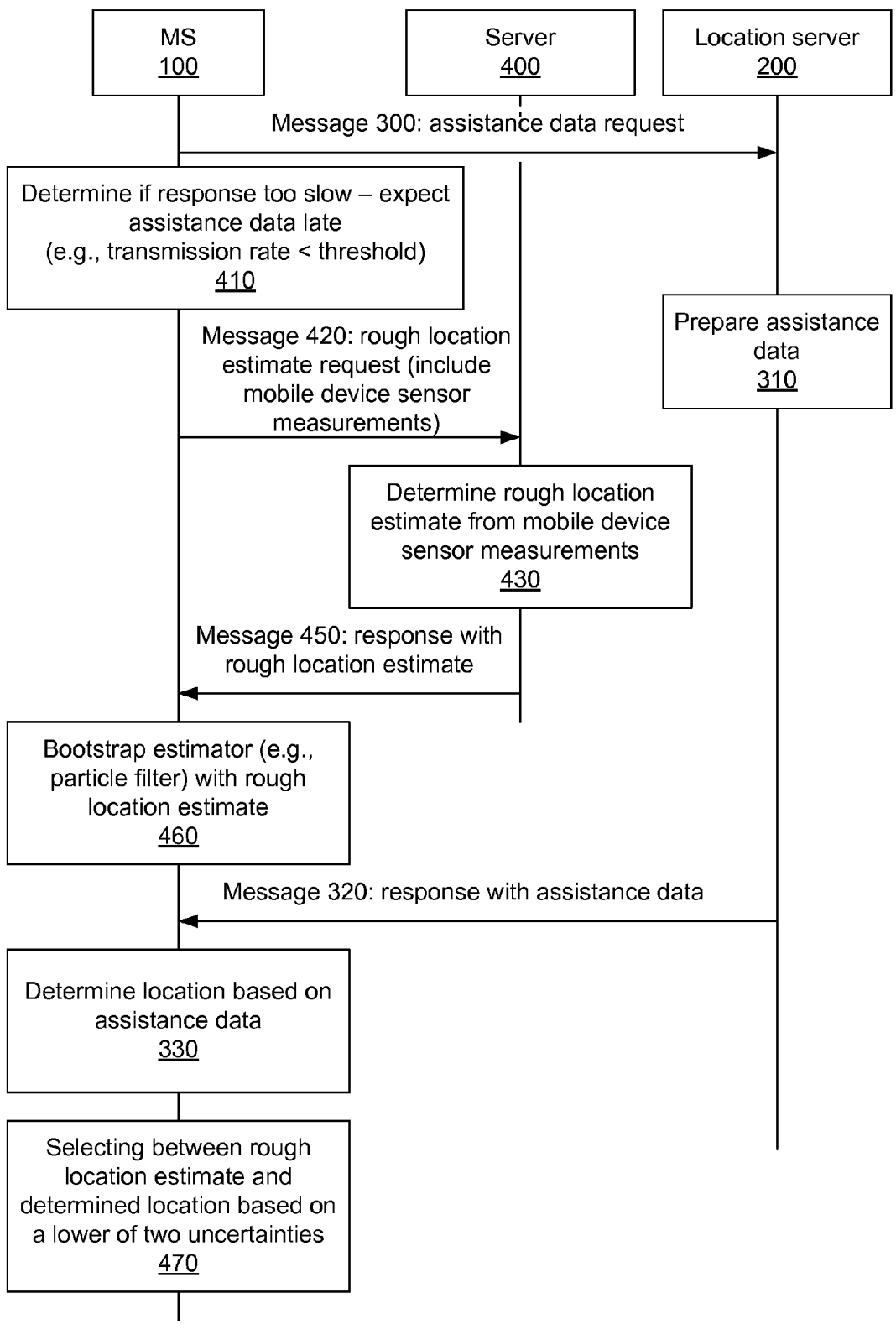
FIG. 2 illustrates bootstrapping an estimator with a rough location, in accordance with some embodiments of the present invention.

FIG. 2 illustrates bootstrapping an estimator with a rough location, in accordance with some embodiments of the present invention. First, a mobile device 100 sends message 300 to a location server 200. The message 300 contains an assistance data request. At 410, the mobile device 100 determines if a response is expected with a substantial delay. For example, a response will be too slow when the transmission rate is less than a threshold rate or a high level of traffic is on the link from the location server 200 to the mobile device 100.

The mobile device 100 sends message 420 requesting a seed or rough location estimate to a server 400. Message 420 may include mobile device sensor measurements, such as dead-reckoning measurements from one or more accelerometers and/or gyroscopes. Alternatively or in addition to, the sensor measurement may include wireless information, such as WIFI® cell identities (e.g., MAC addresses or signal strengths).

At 430, the server 400 determines a rough location estimate from the mobile device sensor measurements. In message 450, the server 400 sends a response including the determined rough location estimate. The server 400 may also generate and send a low resolution version of a map while assistance data is still being generated and sent in message 320. Once transmission of assistance data in message 320 is complete, the mobile device 100 may locally construct a map from the received assistance data. At 460, the mobile device 100 uses the received rough location estimate from message 450 to bootstrap an estimator (e.g., a particle filter).

The process continues at 310 at the location server 200. The process in the location server 200 may occur in parallel with actions on the server 400. After the location server 200 prepares assistance data, the location server 200 sends the mobile device 100 a response including this assistance data in message 320. If the speed of the link between the location server 200 and the mobile device 100 is slow, the location server 200 may begin sending message 320 before message 420 and/or message 450. At 330, the mobile device 100 determines a location of the mobile device 100 based on the received assistance data and the bootstrapped estimator.

At 470, the mobile device 100 optionally selects between the rough location estimate and the determined location based on which of the two locations has a lower uncertainty. That is, the rough location estimate from server 400 may have a first uncertainty and the estimator may result in a second uncertainty. Often the estimator's uncertainty is lower than the uncertainty from the server 400 but not necessarily.

Figure 3:
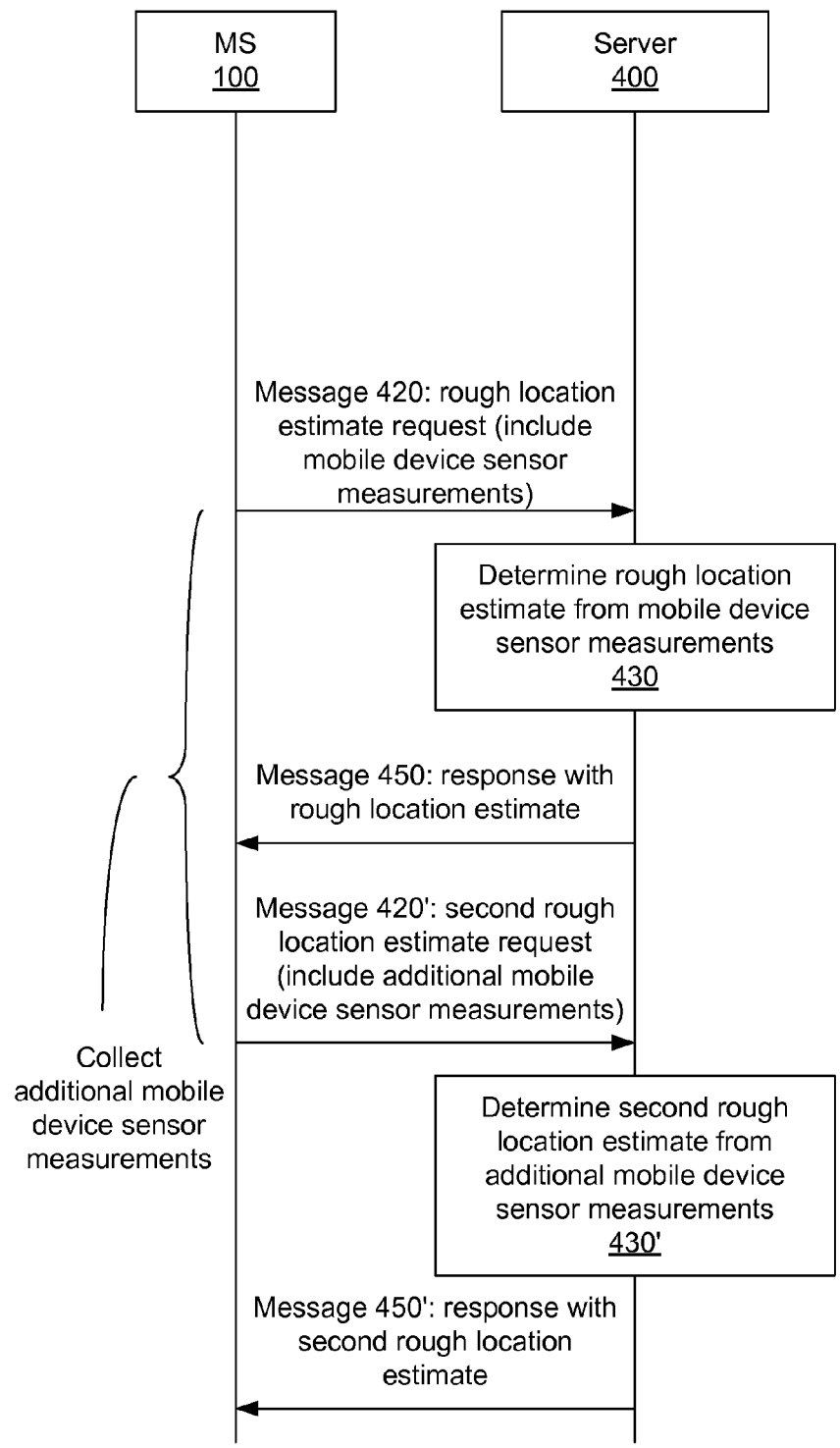
FIG. 3 illustrates repeating a rough location update request, in accordance with some embodiments of the present invention.

FIG. 3 illustrates repeating a rough location update request, in accordance with some embodiments of the present invention. When the mobile device 100 is idle before assistance data is received, the mobile device 100 may send the server 400 additional sensor measurements, which may result in additional rough location estimate(s). In the case shown, the mobile device 100 has additional time to receive a second rough location estimate.

Message 420 is sent from the mobile device 100, received by the server 400 and includes sensor measurements. At 430, the server 400 determines a rough location. Message 450 is sent by the server 400 and received by the mobile device 100. Message 420, step 430 and message 450 are described in more detail above.

After the mobile device 100 sends sensor measurements to the server 400 in message 420, the mobile device 100 may collect additional mobile device sensor measurements. Alternatively, a rough location having an uncertainty received in a response message 450 or computed locally may be greater than a threshold uncertainty.

The process of obtaining a rough location estimate repeats with message 420', step 430' and message 450' equivalent to message 420, step 430 and message 450 described above. In message 420', the mobile device 100 sends a second request for a rough location estimate. The second request may include the additional mobile device sensor measurements. Message 420' may follow message 450 (as shown) or may precede message 450. At 430', the server 400 determines a second rough location estimate from the additional mobile device sensor measurements. In some embodiments, step 430' determines a second rough location based on only the additional mobile device sensor measurements while in other embodiments the server 400 uses both the additional mobile device sensor measurements and passed mobile device sensor measurements. Next, message 450' is sent by the server 400 and received by the mobile device 100. Message 450' contains a response with the second rough location estimate. The mobile device 100 may continue to collect mobile device sensor measurements and may continue to request and receive refine rough location estimates from the server 400. A subsequent message 450 may also contain updated maps (see FIG. 5) and/or data structures (see FIG. 6) as described in more detail below.

Figure 4:
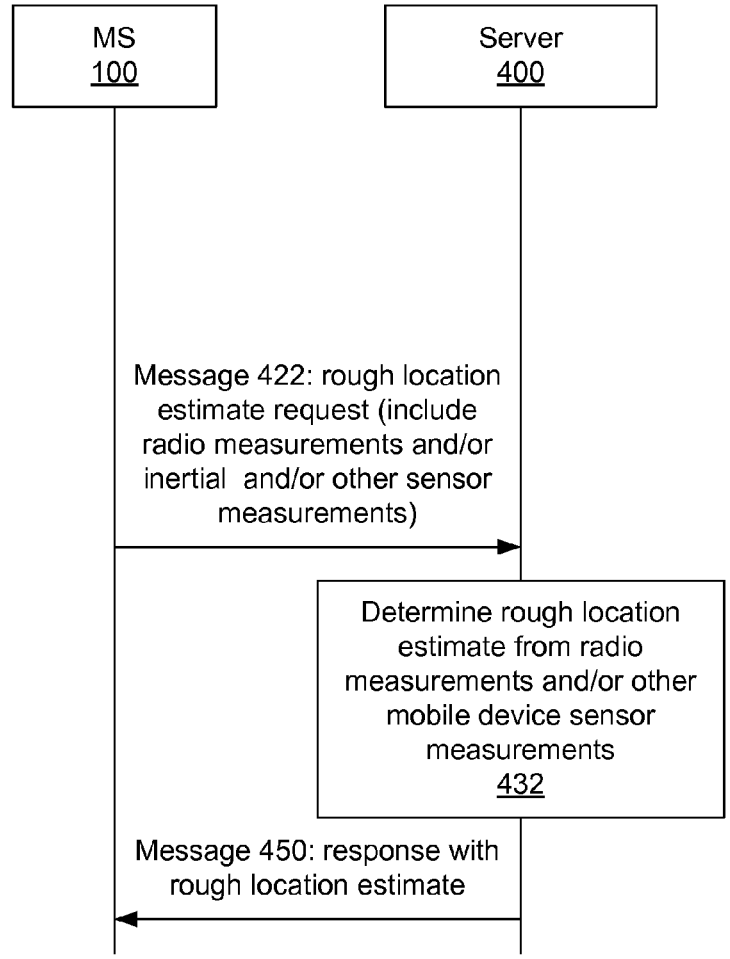
FIG. 4 shows that mobile device sensor measurements may be radio measurements, inertial sensor measurements and/or other sensor measurements, in accordance with some embodiments of the present invention.

FIG. 4 shows that mobile device sensor measurements may be radio measurements, inertial sensor measurements and/or other sensor measurements, in accordance with some embodiments of the present invention. In some embodiments, a mobile device 100 sends and a server 400 receives radio signal measurements, for example, WIFI® MAC addresses and/or signal strength values and/or propagation times. In other embodiments, the mobile device sensor measurements include inertial sensor measurements, for example, from one or more accelerometers and/or gyroscopes. Still in other embodiments, the mobile device sensor measurements include both radio measurements and inertial sensor measurements.

The mobile device 100 sends and the server 400 receives message 422 to request a rough location estimate. The request is equivalent to message 420 described above. Message 422 may include radio measurements, inertial sensor measurements and/or other sensor measurements. At 432, the server 400 determines a rough location estimate from the radio measurements, inertial sensor measurements and/or other sensor measurements. Step 432 is equivalent to step 430 described above. Response message 450 is sent by the server 400, received by MS the mobile device, and contains a rough location estimate based on the mobile device sensor measurements.

Figure 5:
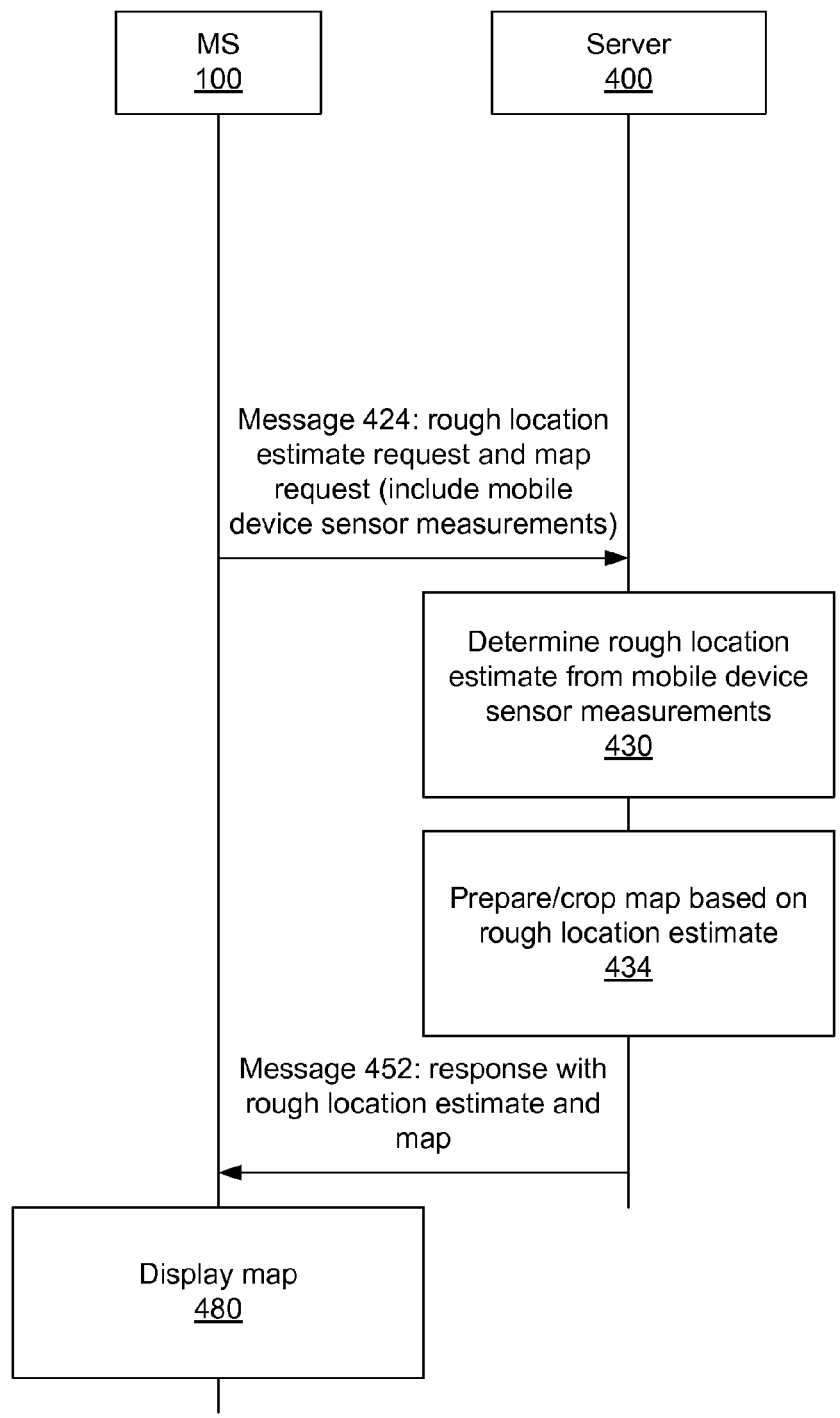
FIG. 5 shows a server preparing and sending a map to a mobile device, in accordance with some embodiments of the present invention.

FIG. 5 shows a server preparing and sending a map to a mobile device, in accordance with some embodiments of the present invention. Message 424 includes a request for a rough location estimate and a map. Similar to messages 420 and 422 described above, message 424 may also include mobile device sensor measurements. At 430, the server 400 determines a rough location estimate from the mobile device sensor measurements. At 434, the server 400 prepares and/or crops a map based on the determined rough location estimate of the mobile device 100. In message 452, the server 400 responds with the rough location estimate and also the map prepared at step 434.

In some embodiments, the mobile device 100 displays the map received in message 452 as shown at 480. For example, the mobile device 100 displays the map in a social application or other map displaying application. In the case where a rough location estimate and a corresponding rough map are known, the user is presented with a visual map until a more detailed and accurate map may be determined. In some embodiments, once transmission of assistance data in message 320 is complete, the mobile device 100 may be able to construct a locally-generated map on the mobile device 100 from the received assistance data.

Figure 6:
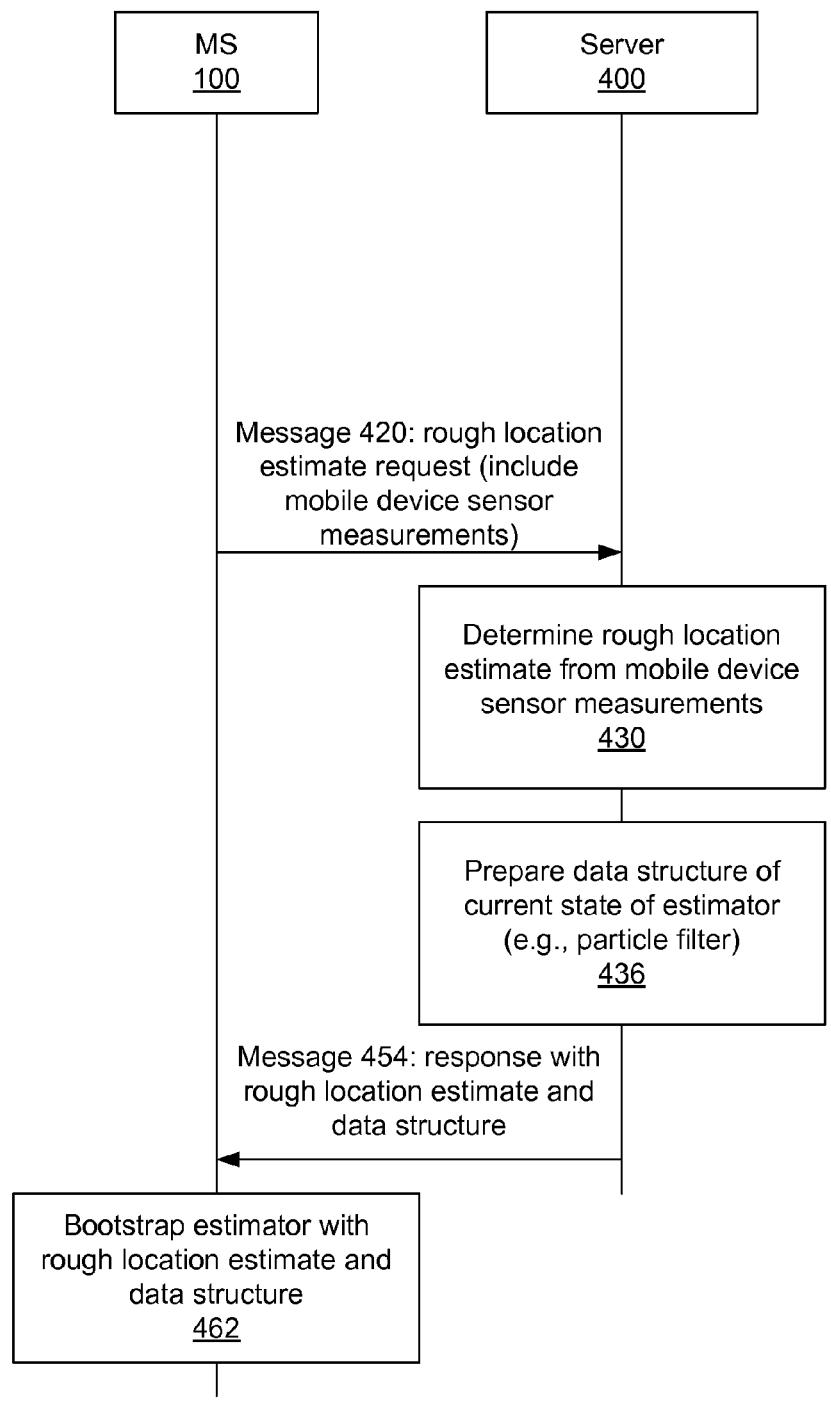
FIG. 6 illustrates a data structure exchange used to bootstrap an estimator, in accordance with some embodiments of the present invention.

FIG. 6 illustrates a data structure exchange used to bootstrap an estimator, in accordance with some embodiments of the present invention. A mobile device 100 sends and a server 400 receives message 420 requesting a rough location estimate. At 430, the server 400 determines a rough location estimate based on the mobile radio sensor measurements. At 436, the server 400 prepares a data structure for a current state to be loaded into a particle filter or other estimator. Message 454 is sent by the server 400 and received by the mobile device 100. Message 454 contains a rough location estimate (determined at step 430) and a data structure (prepared at step 436). At 462, the mobile device 100 uses the rough location estimate and the data structure (from message 454) to bootstrap an estimator. A bootstrapped estimator may more quickly estimate a location. The data structure may also contain the rough location estimate for convenience.

Figure 7:
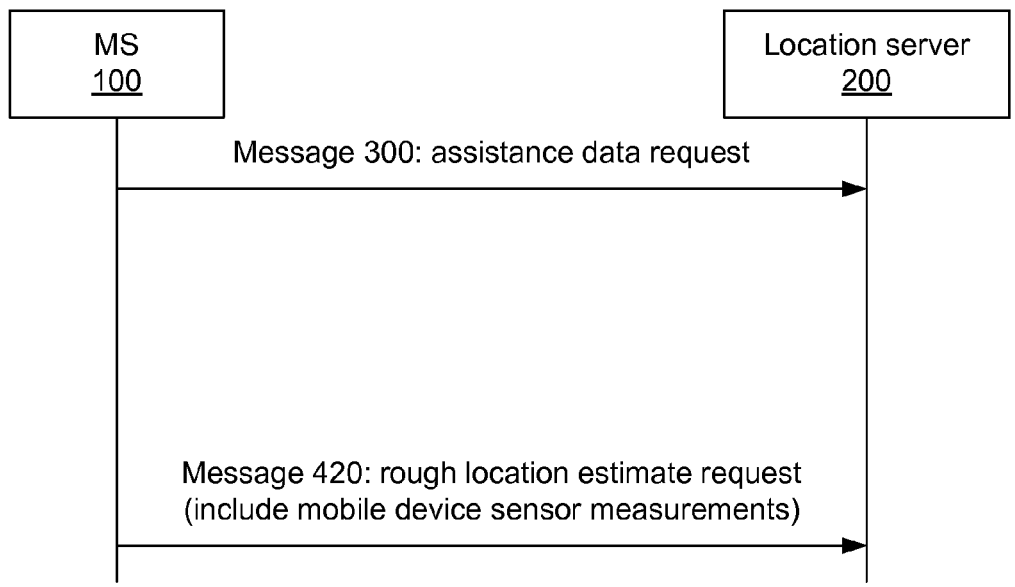
FIGS. 7 and 8 illustrate requests sent to a common server and to separate servers, in accordance with some embodiments of the present invention.
Figure 8:
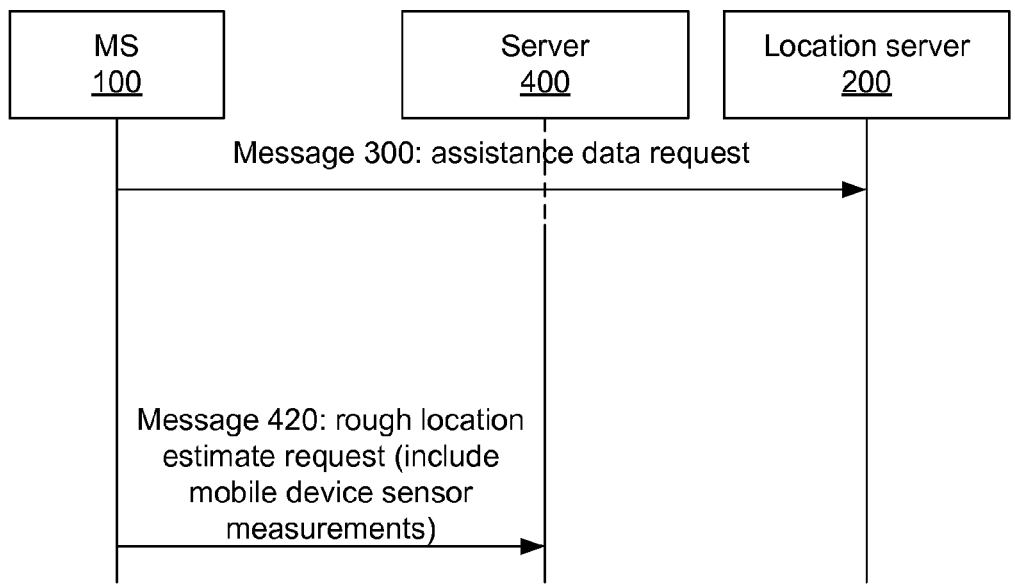

FIGS. 7 and 8 illustrate requests sent to a common server and to separate servers, in accordance with some embodiments of the present invention. In FIG. 7, a mobile device 100 sends message 300 to request assistance data from a location server 200. Within the same message or a separate message, the mobile device 100 sends the server 200 a request for a rough location estimate in message 420. Message 420 may also contain mobile device sensor measurements. In this embodiment, the location server 200 also acts to the mobile device 100 as server 400. In FIG. 8, a mobile device 100 sends message 300 to a location server 200 to request assistance data. In a separate message 420, the mobile device 100 sends message 420 to a server 400. In this embodiment, the mobile device 100 directs messages to two different servers.

Figure 9:
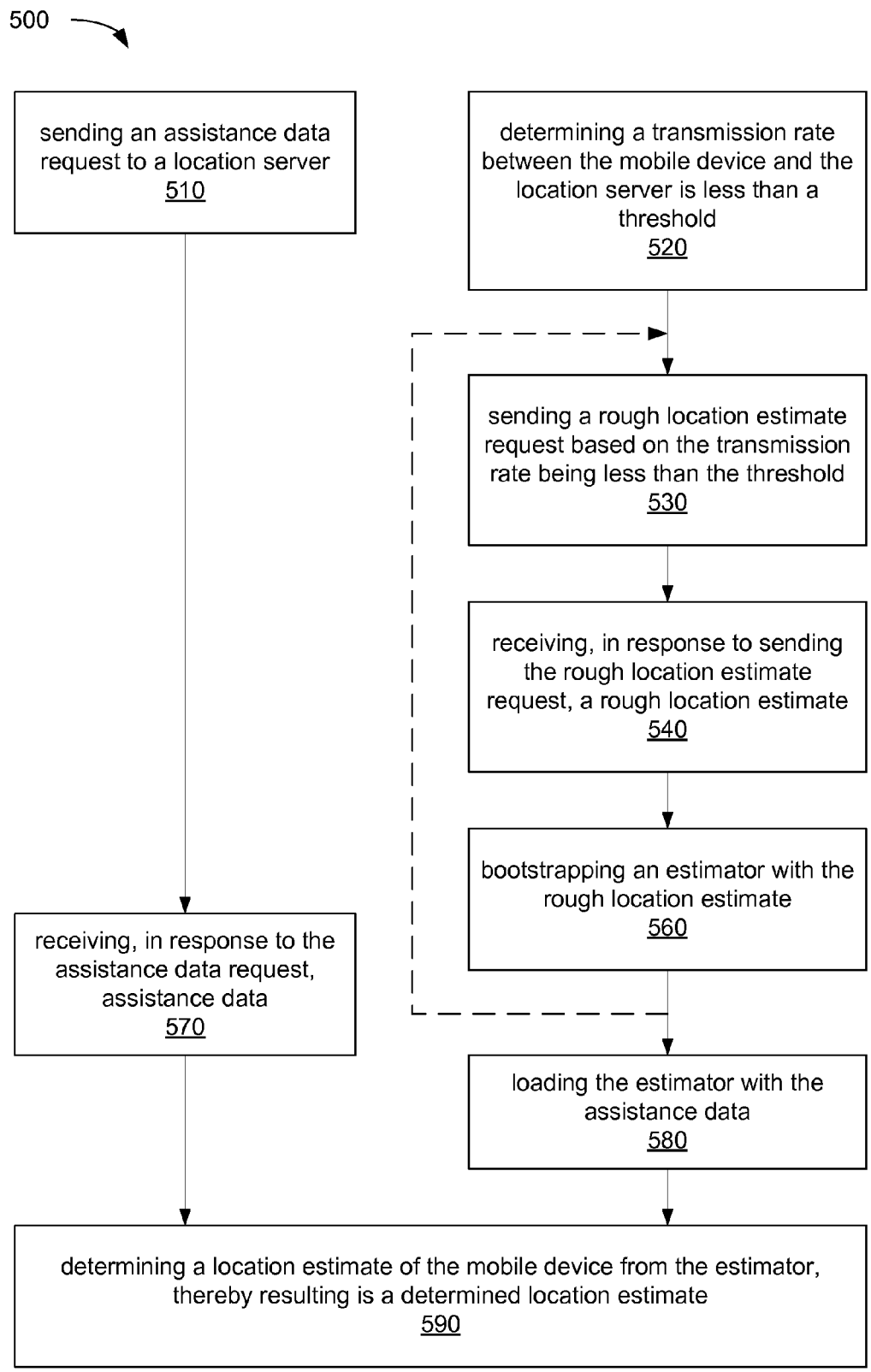
FIG. 9 shows a method in a mobile device to estimate a location, in accordance with some embodiments of the present invention.

FIG. 9 shows a method in a mobile device 100 to estimate a location, in accordance with some embodiments of the present invention. At 510, the mobile device 100 sends an assistance data request to a location server 200. Simultaneously, before or after, the mobile device 100 determines that a transmission rate between the mobile device 100 and the location server 200 is less than a threshold at 520. As a result at 530, the mobile device 100 sends a rough location estimate request based on the transmission rate being less than the threshold to a server 400. The rough location estimate request may also contain mobile device sensor measurements.

At 540, the mobile device 100 receives from the server 400 a rough location estimate, in response to sending the rough location estimate request. The mobile device 100 uses the rough location estimate as a seed for an estimator. The mobile device 100 may also receive a map and/or an estimator data structure from server 400, as described above with relation to FIGS. 5 and 6, respectively. At 560, the mobile device 100 bootstraps an estimator with the rough location estimate as a seed location. If available, the mobile device 100 may also display a map received from the server 400 and/or load the estimator with the data structure.

In FIG. 9, the dotted line indicates that the process between the mobile device 100 and the server 400 may repeat one or more times with additional sensor measurement at 530 resulting in a refined seed and/or refined map and/or refined estimator data structure in 560. At 570, the mobile device 100 receives the assistance data in response to the assistance data request from the location server 200. The mobile device 100 then loads the estimator with the assistance data and/or the refined estimator data structure. Finally at 590, the mobile device 100 determines a location estimate of the mobile device 100 from the estimator to result in a determined location estimate.

Figure 10:
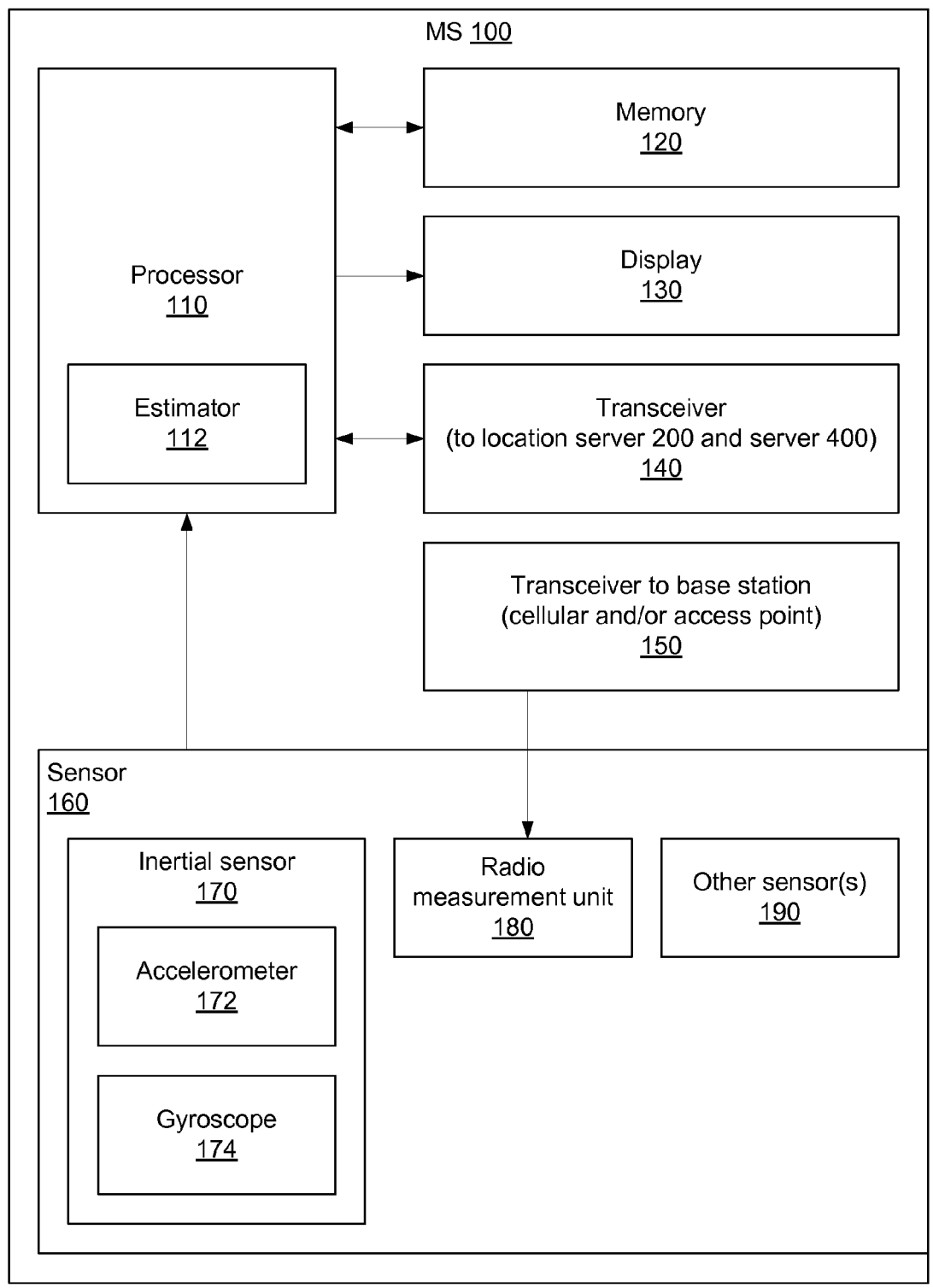
FIG. 10 shows a mobile device, in accordance with some embodiments of the present invention.

FIG. 10 shows a mobile device 100, in accordance with some embodiments of the present invention. The mobile device 100 includes a processor 110, memory 120, a display 130, a transceiver 140, a transceiver 150 and a sensor 160. The processor 110 may be a special purpose processor or a general purpose processor. The processor 110 contains software modules including an estimator 112, such as a particle filter. The memory 120 contains software code that, when executed, estimates a location according to methods described herein. The display 130 shows a coarse map, refined map and/or a final map with a coarse position, refined position or final position, respectively. The transceiver 140 allows the processor 110 to communicate with a location server 200 or a server 400. The transceiver 150 allows the sensor 160 to receive radio signals (e.g., from WIFI® access points) and identify radio address (e.g., MAC addresses) and/or signal strength measurements (e.g., RSSI measurements) and/or timing measurements (e.g., RTT measurements).

Figure 11:
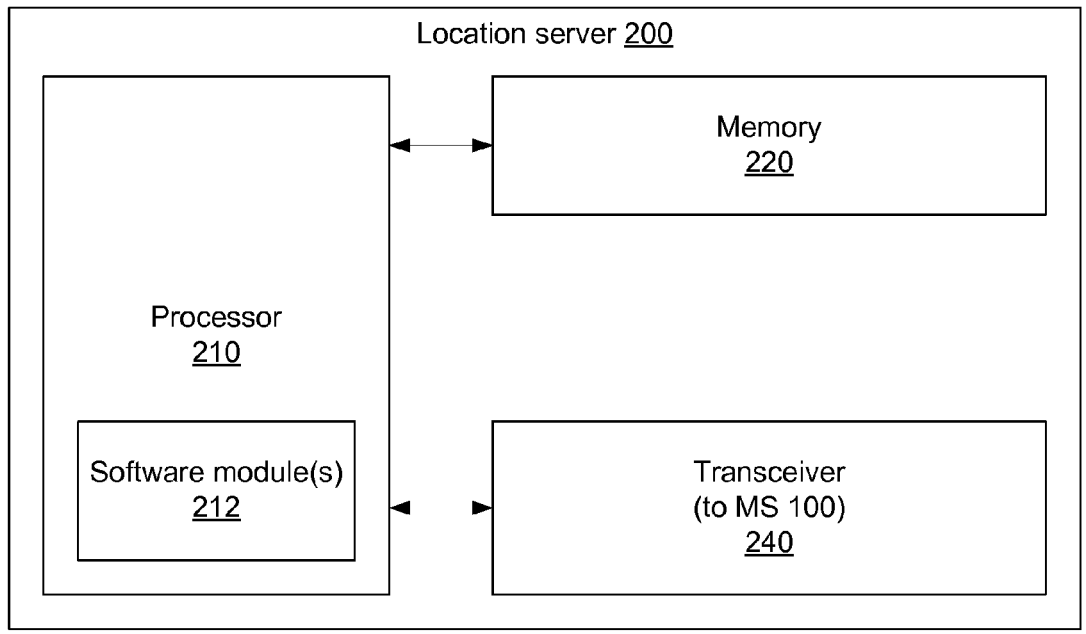
FIG. 11 shows a location server, in accordance with some embodiments of the present invention.

FIG. 11 shows a location server 200, in accordance with some embodiments of the present invention. The location server 200 includes a processor 210, memory 220 and a transceiver 240. The processor 210 may be a special purpose processor or a general purpose processor. The processor 210 contains one or more software modules 212. The memory 220 contains software code that executes as a software module 212 on the processor 210. The transceiver 240 allows the processor 210 to communicate with one or more mobile devices 100. Often the transceiver 240 is logically connected with the mobile device 100 but is physically separated by a base station.

Figure 12:
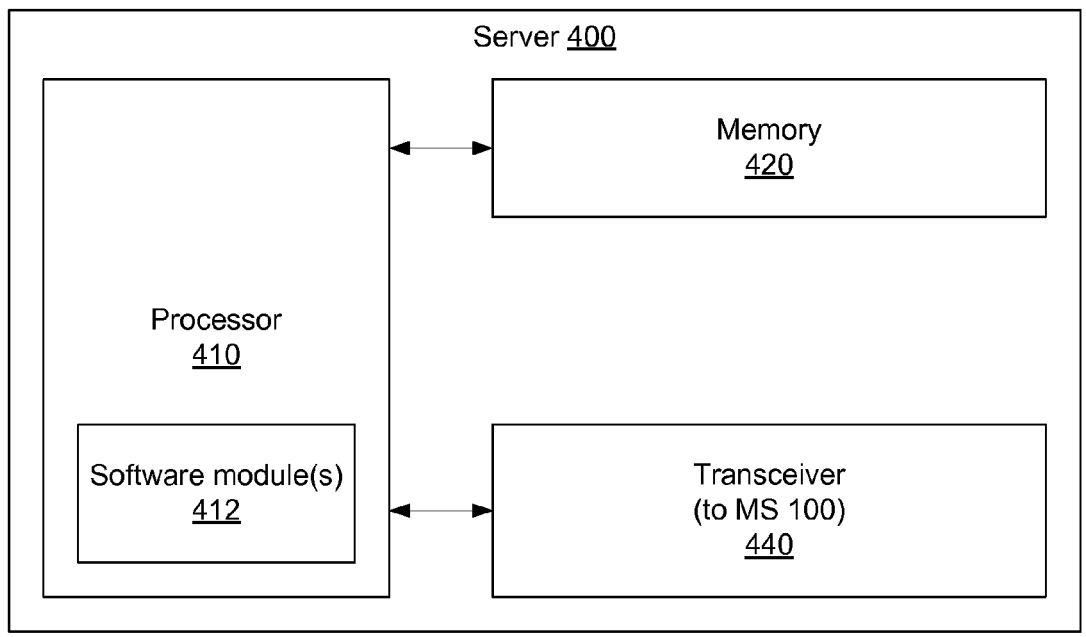
FIG. 12 shows a server, in accordance with some embodiments of the present invention.

FIG. 12 shows a server 400, in accordance with some embodiments of the present invention. The server 400 includes a processor 410, memory 420 and a transceiver 440. The processor 410 may be a special purpose processor or a general purpose processor. The processor 410 contains one or more software modules 412. The memory 420 contains software code that executes as a software module 412 on the processor 410. The transceiver 440 allows the processor 410 to communicate with one or more mobile devices 100. Often the transceiver 440 is logically connected with the mobile device 100 but is physically separated by a base station.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device to estimate an indoor location, the method comprising:
    sending an assistance data request to a location server;
    determining that a link rate for a response to the assistance data request between the mobile device and the location server is less than a first threshold;
    sending a location estimate request when the link rate is less than the first threshold;
    receiving a first location estimate in response to sending the location estimate request;
    receiving, subsequent to the first location estimate, assistance data in response to the assistance data request; and
    determining, based on the first location estimate and the assistance data, a second location estimate of the mobile device;
    wherein an uncertainty of the second location estimate is less than an uncertainty of the first location estimate.

2. The method of claim 1, further comprising:
    determining an uncertainty of a locally-computed location estimate is greater than a second threshold;
    wherein the location estimate request is sent based further on the uncertainty of the locally-computed location estimate being greater than the second threshold; and
    wherein the locally-computed location estimate is computed in the mobile device.

3. The method of claim 1, wherein sending the location estimate request comprises sending the location estimate request to the location server.

4. The method of claim 1, wherein sending the location estimate request comprises sending the location estimate request to a server distinct from the location server.

5. The method of claim 1, wherein the location estimate request comprises mobile device sensor measurements.

6. The method of claim 5, wherein the mobile device sensor measurements comprise measurements of access points.

7. The method of claim 6, wherein the measurements of access points comprise at least one of:
    received signal strength indication (RSSI) measurements; or
    round-trip time (RTT) measurements.

8. The method of claim 5, wherein the mobile device sensor measurements comprise inertial sensor measurements.

9. The method of claim 1, further comprising:
    receiving a cropped map, wherein the cropped map is based on the first location estimate; and
    displaying the cropped map.

10. The method of claim 1, wherein determining the second location estimate of the mobile device comprises:
    receiving a data structure, wherein the data structure comprises a current state for loading into a particle filter; and
    loading the particle filter with the assistance data and the data structure.

11. The method of claim 10, wherein the particle filter determines the second location estimate.

12. The method of claim 1, further comprising:
    sending a second location estimate request; and
    receiving, in response to sending the second location estimate request, a third location estimate;
    wherein an uncertainty of the first location estimate is greater than an uncertainty of the third location estimate.

13. The method of claim 1, further comprising selecting, as the location of the mobile device, the second location estimate.

14. The method of claim 1, wherein receiving the assistance data comprises receiving assistance data with progressively increasing resolution.

15. A mobile device for estimating an indoor location, the mobile device comprising:

means for sending an assistance data request to a location server;
means for determining that a link rate for a response to the assistance data request between the mobile device and the location server is less than a first threshold;
means for sending a location estimate request when the link rate is less than the first threshold;
means for receiving a first location estimate in response to sending the location estimate request;
means for receiving, subsequent to the first location estimate, assistance data in response to the assistance data request; and
means for determining a second location estimate of the mobile device;
wherein an uncertainty of the second location estimate is less than an uncertainty of the first location estimate.

16. The mobile device of claim 15, wherein the means for sending the location estimate request comprises means for sending the location estimate request to the location server.

17. The mobile device of claim 15, wherein the means for sending the location estimate request comprises means for sending the location estimate request to a server distinct from the location server.

18. The mobile device of claim 15, wherein the location estimate request comprises mobile device sensor measurements.

19. The mobile device of claim 15, further comprising:
means for receiving a cropped map, wherein the cropped map is based on the first location estimate; and
means for displaying the cropped map.

20. The mobile device of claim 15, wherein means for determining the second location estimate of the mobile device comprises:
means for receiving a data structure, wherein the data structure comprises a state for loading into a particle filter; and
means for loading the particle filter with the assistance data and the data structure.

21. The mobile device of claim 15, further comprising means for selecting, as the location of the mobile device, the second location estimate.

22. A mobile device for estimating an indoor location, the mobile device comprising:
a transmitter configured to send an assistance data request to a location server and to send a location estimate request;
a receiver configured to receive a first location estimate sent in response to sending the location estimate request, and to subsequently receive assistance data sent in response to the assistance data request; and
a processor coupled to the transmitter, the receiver and the location estimator, wherein the processor is configured to:
initiate sending the assistance data request through the transmitter,
determine that a link rate for a response to the assistance data request between the mobile device and the location server is less than a first threshold,
initiate sending of the location estimate request through the transmitter, when the link rate is less than the first threshold; and
determine the second location estimate of the mobile device based on the first location estimate and the assistance data received by the receiver,
wherein an uncertainty of the second location estimate is less than an uncertainty of the first location estimate.

23. The mobile device of claim 22, wherein the location estimate request comprises mobile device sensor measurements.

24. The mobile device of claim 23, wherein the mobile device sensor measurements comprises measurements of access points.

25. The mobile device of claim 23, wherein the mobile device sensor measurements comprises inertial sensor measurements.

26. The mobile device of claim 22, wherein the receiver is configured to receive a cropped map, wherein the cropped map is based on the first location estimate, and further comprising a display configured to display the cropped map.

27. The mobile device of claim 22, wherein to determine the second location estimate:
the receiver is further configured to receive a data structure, wherein the data structure comprises a state for loading into a particle filter, and
wherein the processor is further configured to load the particle filter with the assistance data and the data structure obtained from the receiver.

28. The mobile device of claim 22, wherein the processor is further configured to select the second location estimate.

29. A non-transitory computer-readable storage medium including program code stored thereon, comprising program code to estimate an indoor location by configuring a processor on a mobile device to:
send an assistance data request to a location server;
determine that a link rate for a response to the assistance data request between the mobile device and the location server is less than a first threshold;
send a location estimate request when the link rate is less than the first threshold;
receive a first location estimate in response to sending the location estimate request;
receive, subsequent to the first location estimate, assistance data in response to the assistance data request; and
determine, based on the first location estimate and the assistance data, a second location estimate of the mobile device,
wherein an uncertainty of the second location estimate is less than an uncertainty of the first location estimate.

30. The non-transitory computer-readable storage medium of claim 29, wherein the program code to send the first location estimate request comprises code to send the first location estimate request to the location server.

* * * * *